Sept. 6, 1932.    A. WRIGHT    1,876,123
SEWAGE DISPOSAL APPARATUS
Filed Feb. 28, 1928    2 Sheets-Sheet 1
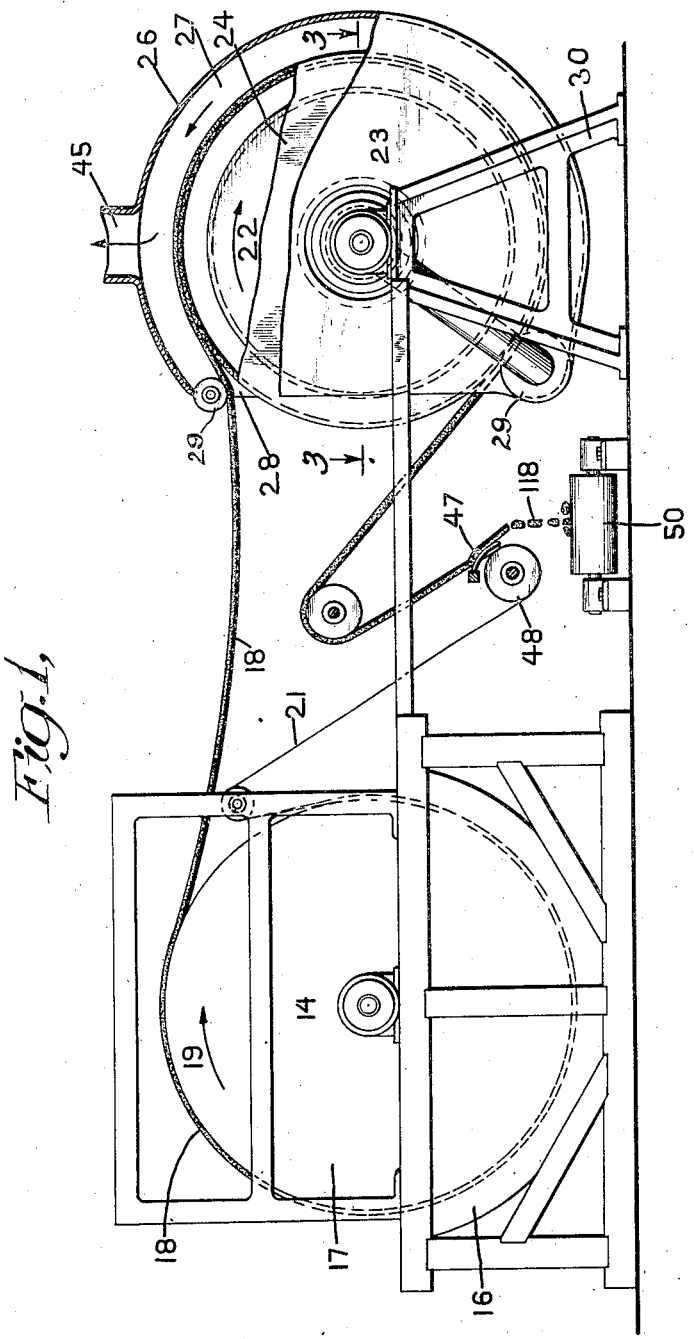
Inventor
ARTHUR WRIGHT
By his Attorneys
Bohleber & Ledbetter

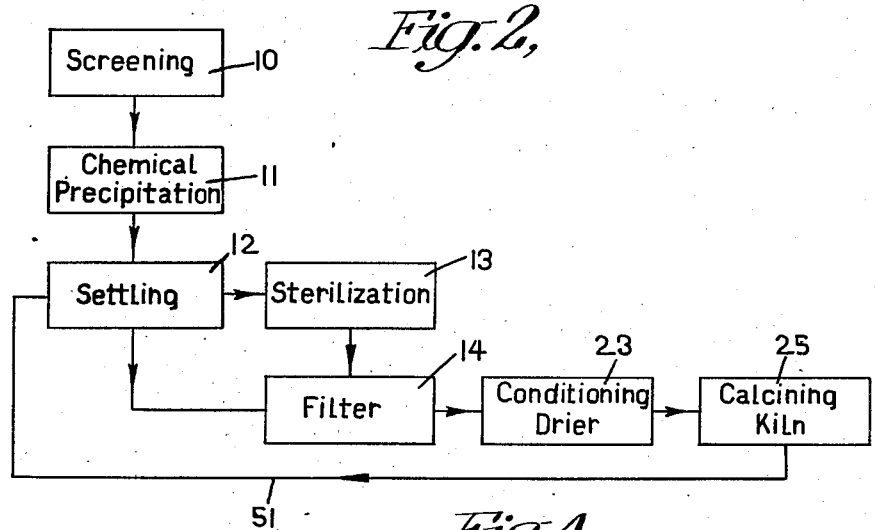
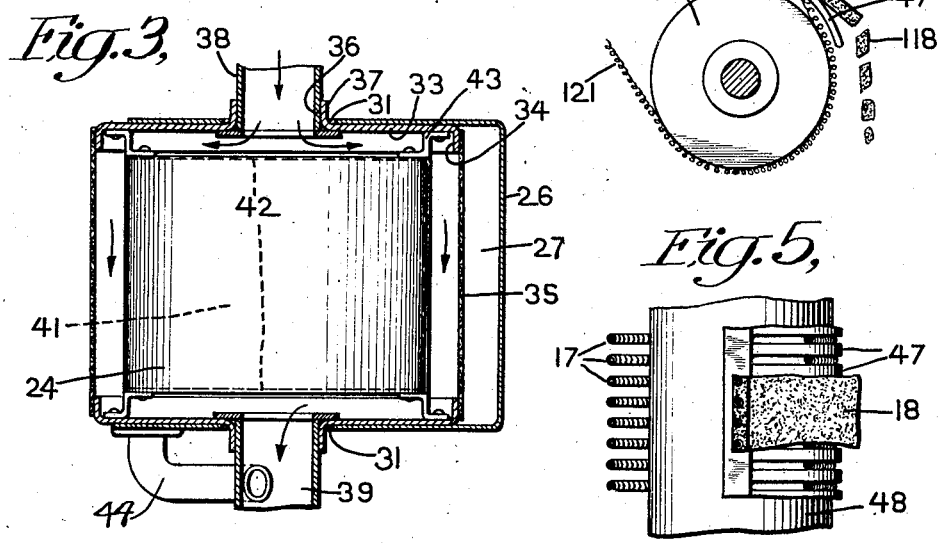

Patented Sept. 6, 1932

1,876,123

UNITED STATES PATENT OFFICE

ARTHUR WRIGHT, OF UPPER MONTCLAIR, NEW JERSEY

SEWAGE DISPOSAL APPARATUS

Application filed February 28, 1928. Serial No. 257,771.

This invention relates broadly to sewage disposal. In a copending application by the present applicant filed May 10, 1927, Serial No. 190,380, there is disclosed a method of sewage disposal in which the sludge is dewatered to a point beyond that usually attained, preferably in a filtering step, and is then, if desired, subjected to a subsequent drying step to further reduce its moisture content. Thereafter, if necessary, the sludge may be partially destroyed, preferably in an inoffensive manner and, where desired, a recovery may be effected of the calcareous agent used to effect chemical precipitation.

The present invention has for its object an apparatus by which any or all of the foregoing steps may be realized.

For a further understanding of the invention, reference will now be had to the accompanying drawings, illustrating one embodiment by which the invention may be realized, and in which:

Figure 1 is a view showing, in side elevation, a filter and conditional drier by which certain steps of the method may be carried out.

Figure 2 is a diagrammatic view illustrating the several units involved in this invention.

Figure 3 is a horizontal sectional view of the conditioning drier taken in the plane indicated by the line 3—3 of Figure 1 and looking in the direction of the arrows.

Figure 4 is a fragmentary view showing the conveying and reenforcing means for the cake of dewatered sludge, by means of which the cake is removed from the filter and conducted about the conditional drier and thereafter discharged.

Figure 5 is a view on the line 5—5 of Figure 4.

In rectifying sewage wastes, both domestic and industrial, a number of processes are now in effect. The requirement in every process is to obtain an innocuous liquid and an inoffensive sludge that can be easily disposed of. Those processes that deliver the best grade of effluent generally produce a voluminous sludge. Extreme difficulties have been encountered in handling this sludge so as to maintain the specification of freedom from nuisance, and ease of handling.

One method of sewage disposal, as now practiced, to which the present invention is applicable comprises, briefly, a screening of the sewage, as at 10 in the diagram of Figure 2, for the removal of oversize particles. The unsettled waste is then led to a reagent dosing tank indicated schematically at 11 wherein proper precipitation, that is, an excess of causticity of the precipitate, is effected by the addition of some calcareous agent. Thereafter the effluent may be subjected to a settling, as at 12, of such solids as are capable of settling. Then, if desired, a sterilization may be effected, as at 13, to kill organic matter which would otherwise set up putrefaction and give rise to offensive odors.

From either the dosing tank 11 or after the step of sterilization at 13, the effluent has heretofore been conveyed to a settling tank where the clarified liquids are decanted and a sludge is settled out and sometimes thereafter filtered by bed filters but this sludge has a moisture content of approximately 90%. The volume to be handled of this dewatered sludge is considerable, and in cities of large population becomes an item of real importance since it must be carried away and disposed of.

It has been demonstrated in a sewage plant for a city of a population of 75,000 that the sludge obtained from chemical precipitation processes can be mechanically filtered in accordance with this invention to deliver a solid containing between 60 and 70% moisture. In this state it is transportable and relatively free from odors and such as there are, are not offensive.

I prefer to accomplish the mechanical filtration after either the settling or the sterilization by means of continuous rotary filters, as indicated at 14 in the diagram of Figure 2, and I may either scrape the solids from the filter cloth or preferably remove it by a filter cake reenforcement taking the cake away from the filter in the form of a continuous belt.

For instance, in Figure 1, I have illustrated a filter tank 16 into which the sludge from either the settling means 12 or the sterilization means 13 is conducted. The tank 16 has rotating therein a filter drum 17 continuously rotating therein in the direction of the arrow 19, upon which a filter cake 18 composed of the solids of the effluent is built up by the reduction of pressure within the drum.

Encircling the peripheral surface of this filter drum 17 and adjacent the filtering medium (not shown) thereon is a continuous cake reenforcement 21 which I prefer shall comprise a plurality of spaced independent and substantially parallel strands. The filter cake 18 builds up upon the filtering medium and about these strands 21 so that the strands are embedded therein and serve as a reenforcement therefor. After the completion of the filtering operation the strands 21 are conducted away from the drum and carry with them the filter cake 18 as a continuous sheet of cake, thus obviating the necessity for scrapers. Such a cake of sludge will be found to have a moisture content of not more than 60% to 70%.

In some situations the sludge content will be found to have a deleterious effect upon the reenforcing strands 21 and to prevent their deterioration such strands may be formed of a metal which will resist the corrosive action of the constituents of the sludge, as for instance Monel metal, resistant iron or the like. Some elasticity in the reenforcement is required, as will be readily understood by those skilled in the art, and where metallic strands 21 are availed of, all or a portion of each strand may be formed as a tension spring, as illustrated in Figure 4 at 121.

The cake 18 may then have its moisture content reduced still further by being led to a conditioning drier indicated in Figure 2 at 23 which is effective to reduce the moisture content so that the cake is no longer sticky. This conditioning drier may comprise a drying chamber through which the belt of cake may be conveyed, but I have illustrated the passage of the cake 18 from the filter 14 into contact with a movable drier in the form of a drum 24 heated preferably by the products of combustion from the calcining kiln 25 effecting a subsequent step of the process hereinafter to be described. The conditioning drier drum 24 is preferably disposed in proximity to the filter 14 and is encircled by the reenforcement 21 bearing the sludge filter cake 18 as shown in Figure 1. The drum 24 is disposed within a housing 26 preferably of cylindrical shape so that the cake travels in the chamber 27 formed between the peripheral surface of the drum 24 and the housing 26. As illustrated in Figures 1 and 3 the housing 26 is formed with an opening 28 on one side through which the reenforced cake 18 enters and leaves the chamber 27 and this opening 28 is sealed against the admission of air into the cake passage 27 by the idler rollers 29, at the top and bottom of the housing 26 with which the cake contacts as it enters and leaves the chamber 27. The housing 26 may be supported in suitable fashion, as by the frame 30.

At its opposite sides and axially thereof the cylindrical casing is provided with apertures 31.

The drum 24 is disposed within the housing 26 to closely fit the ends thereof, although so as to still have freedom of rotation in the direction of the arrow 22. It is formed of substantially circular plate-like end members 33 inwardly turned at their periphery to form flanges 34 to support the perforate peripheral surface 35. In the illustrated embodiment this peripheral surface 35 takes the form of a screen. The ends 33 of the drum 24 are also provided with apertures 36, axially thereof, which are defined by outwardly turned flanges 37, passing through the apertures 31 in the casing 26 and serving as journals by which the drum 24 rotates on hollow bearings 38, 39 carried by the supporting frame 30. As illustrated, the hollow bearing 38 on one side, for instance that shown at the top of Figure 3, receives products of combustion from the calcining kiln 25 and directs them into the interior of the drum 24.

Within the drum 24 there is disposed a cylindrical member 41 formed with closed ends 42. This cylindrical member 41 is conveniently supported by spaced brackets 43 from the ends 33 of the drum. The ends 42 of the cylindrical member 41 serve as baffles to direct the products of combustion entering through the hollow bearing 38 as shown by the arrows toward the periphery of the drum 24 and these products of combustion travel in an axial direction along the periphery to the opposite end where they are withdrawn through a hollow bearing outlet 39. In their passage in proximity to the periphery of the drum 24 the products of combustion are brought into direct contact with the filter cake 18 on the drum through the perforations in the periphery.

From the outlet bearing 39 all or a portion of the products of combustion may be directed into the passage 27 for the filter cake 18 by means of a bypass 44 leading from the drum outlet 39 to the passage 27 near the exit from which bypass 44 they flow through the passage 27 countercurrent to the cake 18 traveling therein as shown by the arrows and are exhausted through the stack 45.

After the step of drying within the conditioning drier 23 the cake 18 is conveyed by the strand reenforcement 21 to discharge devices where the strands 21 are directed, respectively, between the teeth 47 of a comblike separator. The teeth 47 extend in an arc substantially concentric with that of a guide roller 48, about which the strands 21 are thereafter directed and from whence the strands 21 freed of the sludge or filter cake 18, are returned to the filter drum 14 for another load of filter cake.

The fragments 118 of filter cake discharged from the reenforcement may conveniently fall upon the endless conveyor 50 and be conducted to the calcining kiln 25.

The chemical constitution of this dewatered sludge may be more than half lime product and a varying quantity of organic product, running up as high as 40% of the whole in some cases. Even the disposal of sewage sludge of this character presents a problem in cities of large population because the sludge is relatively bulky and must be carted away and disposed of. The high inorganic content of the sludge enables me to drive off moisture from this cake using high temperatures, and thus gaining a high rate of heat transfer and making the drying operation economical. The dewatered cake 118 from the conditioning drier 23 is in a form admirable for feeding to a carbonizing or calcining kiln. Reduction of the lime product to quick lime or hydrated lime is easily effected at relatively low temperatures, by reason of the fact that the heat transfer to the cake is very rapid and further due to the fact that the particle size of the lime products is small and quickly reduced. The organic product, especially the paper and other cellulose products together with the soaps and greases are readily combustible or oxidized and reduce the fuel requirements for reduction of the lime very considerably.

I therefore introduce the dewatered cake 118 from the discharge devices 47—48 to a calcining fliln 25, or the equivalent of any satisfactory commercial character.

I have found, in the operation of a kiln of this character, that if the sludge is burned in a reducing atmosphere, considerable offensive odors may be driven off but if the combustion takes place in an oxidizing atmosphere, that is, in an excess of air, no offensive odor is given off. The products of combustion or a part of them may be led back to the conditioning drier 23 to enter the same through the hollow bearing 38 and used as hereinbefore described. The resultant product of the kiln runs high in lime. When compared with the original impurities in the sewage sludge it may run as high as ninety odd per cent lime so that the resultant product is either a marketable lime or is capable of reuse as the calcareous reagent in the chemical precipitation at the start of the sewage process as shown by the arrow 51 in the chart of Figure 2.

Of course eventually, the impurities from the sewage will have accumulated to such a degree as to render the lime unfit for reuse in precipitation and it is then discarded and fresh lime substituted. Where, however, hard water is originally found in the sewage a greater quantity of lime is derived from the process than is added as the calcareous agent and such lime may be sold as a by-product.

It will thus be seen that there has been devised a continuously operating apparatus, particularly well adapted to the disposal of sewage sludge, whereby the solids are removed mechanically and continuously from a thickened sludge as by a filter; the cake from the filter being dewatered and put into prime condition for feeding to a calciner, and the calciner fed with a source of heat which is augmented by the combustion of cellulose and other combustible products in the sewage to the end that the final product is not only completely free from offense but likewise easily handled for reuse, disposal or for by-product marketing, that is, the recovered product from the calciner may be used as the reagent in the process and the amount of lime required to be purchased and delivered to the plant is reduced, thereby materially minimizing transportation costs and the purchase cost of the lime which is used as the reagent.

This invention in its various aspects has applications other than the disposal of sewage. Moreover, various modifications will occur to those skilled in the art in the composition and configuration of the cooperating elements going to make up the apparatus as a whole, as well as in the combination or the selection of the various elements and certain of the elements are capable of independent use or uses in combination with other elements within the purview of the invention as set forth in the appended claims.

What I claim is:

1. Apparatus for the disposal of sewage and the like comprising means for screening the sewage, sewage dosing means, settling means, a continuous rotary drum type filter, a rotary heated drum, a housing for said drum, a filter cake reenforcement comprising a plurality of separate spaced strands encircling the filter drum and the heated drum to convey filter cake from the filter to the drier, means to separate the filter cake from the reenforcement after it leaves the heated drum, a calcining kiln, means to convey the filter cake from the separating means to the calcining kiln, means to convey products of combustion from the calcining kiln to the housing of the heated drum and means to convey the calcareous product from the calcining kiln to the dosing means.

2. A conditioning drier comprising a rotary drum having a perforate peripheral surface, said drum being journaled upon hollow bearings, a closed cylindrical baffle disposed within the drum, means supporting said baffle in spaced relation with the interior of the drum, a housing within which the drum rotates and a by-pass from a hollow journal to said housing.

3. In combination a conditioning drier comprising a rotary drum having a perforate peripheral surface, said drum being journaled upon hollow bearing, a closed cylindrical baffle disposed within the drum, means supporting said baffle in spaced relation with the drum, a housing within which the drum rotates and a by-pass from the hollow bearing to said housing, a continuous filter, a filter cake reenforcement comprising spaced continuous strands encircling the drums and yielding means forming at least a portion of each strand.

4. A conditioning drier comprising a rotary drum, means to conduct material to be dried to one point of the drum, means to admit heating fluid into the drum, a housing within which the drum rotates, means to remove the material from the drum, a bypass from the interior of the drum to the space between said drum and said housing in proximity to the point of removal of the material from the drum, said bypass serving to conduct heating fluid from the drum to the said space and an outlet from the housing for the heating fluid in proximity to the point at which material is conducted to the drum whereby the said heating fluid passes in countercurrent relation to the said material in its passage on the drum.

5. A conditioning drier comprising a rotary drum, said drum being journaled upon hollow bearings to admit heated fluid therein, baffle means disposed within the drum to direct the heated fluid to the periphery of the drum, a housing within which the drum rotates and a by-pass from a hollow bearing to said housing.

6. In combination, a conditioning drier comprising a rotary drum having a perforate peripheral surface, said drum being journaled upon hollow bearings one of which admits heated fluid therein, a closed cylindrical baffle disposed within the drum to direct said fluid to the periphery of the drum, spaced brackets supporting said baffle in spaced relation with the drum, a housing within which the drum rotates and a by-pass from the other hollow bearing to said housing, a continuous rotary drum type filter, a filter cake reenforcement comprising spaced continuous strands encircling the filter drum and the drying drum within the housing and yielding means forming at least a portion of each strand.

7. The combination with a continuous drum drier and filter cake reenforcement comprising spaced continuous strands, of cake discharging means comprising a roller about which the strands are directed and a comb-like device between the teeth of which the strands pass and whereof said teeth are curved about a portion of the roller.

8. A reenforcement for filter cake and the like comprising a separate independent coiled strand.

9. A reenforcement for filter cake and the like comprising a plurality of spaced independent coiled members.

10. A reenforcement for filter cake and the like comprising a separate independent strand including a resilient portion.

In testimony whereof I affix my signature.
ARTHUR WRIGHT.